United States Patent [19]
Asberg

[11] 3,934,966
[45] Jan. 27, 1976

[54] COOLING WATER PUMP, PREFERABLY OF MOTOR CAR ENGINES

[75] Inventor: Sture Lennart Åsberg, Savedalen, Sweden

[73] Assignee: SKF Industrial Trading and Development Company, B.V., Jutphaas, Netherlands

[22] Filed: June 21, 1974

[21] Appl. No.: 481,877

Related U.S. Application Data
[63] Continuation-in-part of Ser. No. 304,905, Nov. 9, 1972, Pat. No. 3,861,170.

[30] Foreign Application Priority Data
Nov. 11, 1971 Sweden............................ 14399/71

[52] U.S. Cl........ 415/219 C; 415/170 A; 123/41.44
[51] Int. Cl.² ..................... F16C 1/06; F04D 29/22
[58] Field of Search.......... 415/219 C, 170 A; 64/3; 123/41.44, 41.45, 41.46, 41.47; 308/36, 34

[56] References Cited
UNITED STATES PATENTS

| | | | |
|---|---|---|---|
| 2,106,884 | 2/1938 | Bliss................................ | 415/170 A |
| 2,157,597 | 5/1939 | Dupree, Jr...................... | 415/170 A |
| 2,200,151 | 5/1940 | Burkhardt...................... | 415/170 A |
| 2,203,525 | 6/1940 | Dupree, Jr...................... | 415/170 A |
| 2,365,065 | 12/1944 | Frankenfield.................. | 415/170 A |
| 2,506,547 | 5/1950 | Findley........................... | 123/41.44 |
| 2,568,646 | 9/1951 | Little.............................. | 415/219 C |
| 3,131,956 | 5/1964 | Bailey............................ | 415/219 C |
| 3,723,029 | 3/1973 | Laing............................. | 415/219 |
| 3,796,510 | 3/1974 | Gunter........................... | 415/170 A |

FOREIGN PATENTS OR APPLICATIONS

| | | | |
|---|---|---|---|
| 533,579 | 11/1956 | Canada........................... | 123/41.44 |
| 468,918 | 12/1928 | Germany........................ | 123/41.46 |
| 7,537 | 10/1956 | Germany........................ | 415/170 A |

*Primary Examiner*—Henry F. Raduazo
*Attorney, Agent, or Firm*—Howson and Howson

[57] ABSTRACT

A pump unit for liquid-cooled internal combustion engines preferably for vehicle engines and of the type including a pump unit housing, an impeller, a drive member operatively connected to the impeller to rotate the same and forming therewith a rotatable assembly, bearing means supporting the drive member for rotation relative to the housing and a seal adapted to seal an annular space between the rotatable assembly and housing characterized in that the axial length of the pump unit as measured from the impeller to the oppositely located end of the drive member and the pitch diameter of the bearing are of about the same order of magnitude.

9 Claims, 4 Drawing Figures

COOLING WATER PUMP, PREFERABLY OF MOTOR CAR ENGINES

This is a continuation-in-part application of my prior application, Ser. No. 304,905, filed Nov. 9, 1972, entitled "Cooling Water Pump, Preferably of Motor Car Engines", which issued as U.S. Pat. No. 3,861,170, on Jan. 21, 1975.

The present invention relates to a pump unit for liquid cooled internal combustion engines, preferably for a motor car engine. The pump in accordance with the invention constitutes in mounted condition a unit in which the components preferably are undetachably united together.

The conventional cooling water pumps are so designed, that they consist of relatively large parts fastened together with screws and such pumps are relatively heavy and space consuming.

The advantages of the fluid pump in accordance with the present invention are the following:

It is possible to select various materials for this shaftless type of pump. Suitable materials might be aluminum, plastics or pressed metal sheet. In selecting a suitable material, the pump will be cheap and light and has in relationship to the small weight, a good structural strength. The good reliability in operation is depending on the fact that there will be smaller unbalance and smaller masses in the pump components. An important feature of the pump unit of the present invention is its compact design. To this end, since there is no conventional shaft, a bearing is selected with greater pitch diameter preferably of about the same order of magnitude as the axial length of the pump unit measured from the impeller to the oppositely located end of the drive member. Such a bearing, preferably of single row deep groove type, or in some cases of double row angular contact type, is simpler and axially more compact. Additionally, the axial length of the pump unit measured from the impeller to the outer end of drive member and the diameter of the impeller are preferably of the same order of magnitude to provide a compact pump unit. Further, for compactness, the axial length of the pump unit may be of about the same size, or at most, equal to the outer diameter of the impeller. A further advantage is the possibility of getting a good sealing effect since the sealing diameter is very small. The pump unit is so designed that a good ventilating and drying of the bearing is obtained in front of, or behind the same, so that possible fluid particles will not get into contact with the bearing. Regarding an outer-ring-rotated bearing, it is possible to place the seal with its small diameter essentially in the radial center line of the bearing, whereby a considerable increase in the life of the seal is obtained.

The invention will now be described with reference to the accompanying drawings, in which.

Figure 1:
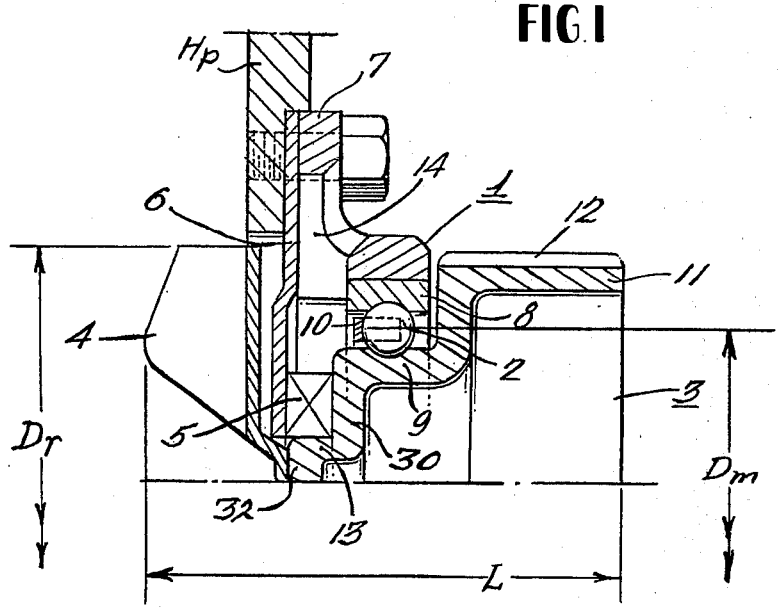
FIG. 1 shows an embodiment of the pump unit with an especially shaped inner-ring-rotated bearing.

Referring now to the drawings and particularly to FIG. 1 thereof, there is illustrated a pump unit constructed in accordance with the present invention, the main components of which include a pump unit housing 1, a bearing 2, a drive member 3, a rotor or impeller 4, and a sealing element 5. In the assembly illustrated, the pump unit housing 1 is detachably mounted by suitable means such as screws to the pump housing $H_p$ to support the pump unit assembly in an opening in the pump housing, which may be a conventional volute casing. It is noted that the pump unit may be secured to the pump housing by other means; for example, by a press fit or be formed integrally therewith.

FIG. 1 shows a cooling water pump in which the pump unit housing 1 consists of a relatively thin wall 6 of pressed sheet metal, die-casted aluminum or plastics which is fixed to a stronger housing portion 7 suitably of aluminum. In said portion 7, the outer ring 8 of the bearing 2 is fitted by shrinkage fit or otherwise. In the embodiment illustrated, the bearing is a single row deep groove ball bearing and the seal 5 is mounted radially inwardly of the pitch circle of the bearing. To this end of the inner end of the drive member 3 is of a stepped configuration to define the inner raceway 9 of the bearing and an axially extending seat 13 of smaller diameter than the raceway 9 for the seal 5. As illustrated, a space or pocket for the seal is provided between the wall 6 of the pump unit housing 1 and the radial leg 30 of the drive member 3 connecting the raceway 9 and seat 13. The rotor 4 is mounted on the radial extension 32 depending from seat 13 by suitable means; for instance, by welding or riveting. The inner raceway 9 is in the embodiment shown integrated with the drive member 3 of the pump unit, but the raceway might also be shaped in a separate inner ring fitted on the drive member 3. In the embodiment shown, the rolling bodies of the bearing consist of balls and the bearing is provided with a cage 10 of suitable type. As shown from the figure, the inner ring will be rotated. The pump unit is in this case driven by a belt from a suitable source of power. For this purpose the part 11 of the drive member 3 is profiled on its outer surface as shown at 12.

In accordance with the present invention, the axial length L of the pump unit measured from the rotor 4 to the outer end of the drive member 3 and the pitch diameter $D_m$ of the bearing are preferably of the same order of magnitude. Additionally, the axial length L of the pump unit and the outer diameter $D_r$ of the rotor 4 are preferably of the same order of magnitude. Further, the axial length L of the pump unit may be about the same size as the outer diameter $D_r$ of the rotor 4, or at most, equal thereto. The arrangement described above provides a very compact pump unit and facilitates the use of a comparatively simple type of bearing such as the single row deep groove ball bearing illustrated. Further, by this construction, the seal can be located in close proximity to the bearing and will be insensitive to any possible wobbling or warping, and thus have an extended life. Seal failure is one of the more common failures in the water pumps in the automotive field. Additionally, a compact pump unit design offers greater freedom in selection of materials so that the pump unit may be made very economically and of light weight construction.

The various components of the pump unit provide a shaftless assembly wherein the various elements such as the bearing, drive member, impeller and pump unit housing preferably form an integral unit which is easily replaceable in the event of pump failure.

In new installations, the seperable integral pump unit of the present invention is adapted for use with various pump housing designs thereby providing a standard unit which may be assembled to a plurality of different designed pump housings and therefore has a non-obsolescent characteristic. Presently, as engine designs are changed, it often necessitates a corresponding design change in the entire water pump assembly.

In the pump unit housing 1 there is provided a number of large openings 14 intended for ventilating, drying and draining purposes. Through these openings there is obtained a very effective ventilating or draining in front of the bearing. Close to the drive side of the pump there can be applied a fan not shown here. This can be designed in such a way that the fan is integrated with the drive member of the pump so that a combined fan and drive member is obtained. The fan can, of course, be a separate part fixed to the drive member.

Figure 2:
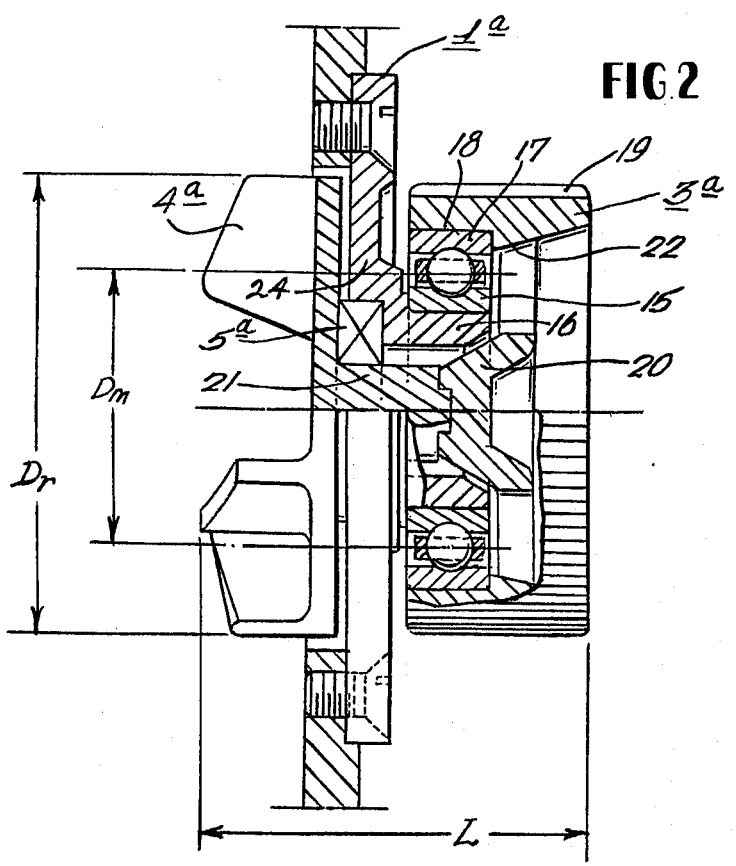
FIG. 2 shows a modification of the pump unit with an outer-ring-rotated bearing.

In FIG. 2 a modification of the cooling water pump unit is shown in which, contrary to the above mentioned embodiment, the outer ring of the bearing rotates. The parts of the pump unit which are similar to the previously described embodiment are referenced by the same numeral with the letter $a$ postscript. In this example a conventional bearing is used, for example, a single row deep groove ball bearing, the inner ring 15 of which is fitted on an annular part 16 of the pump unit housing 1a. The outer ring 17 of the bearing is fitted into a bearing seat 18 in the drive member 3a. The outer surface of the drive member is profiled at 19 as in the first embodiment. The drive member is provided with a web portion 20 which is fixed to a hub portion 21 of the rotor by, for example, welding. The seal 5a is fitted to a suitable place on the portion 21 in connection with the inner part of the pump unit housing 1a. The seal can also be located in the radial center line of the bearing whereby angular warpings are eliminated. The drive member is also in this embodiment provided with large draining/ventilating openings 22.

In the present instance, the axial length L of the pump unit assembly measured from the rotor 4a to the outer end of the drive member 3a, and the pitch diameter $D_m$ of the bearing are preferably of the same order of magnitude. Additionally, the axial length L of the pump unit and the outer diameter $D_r$ of the rotor 4 are preferably of the same order of magnitude. Further, the axial length L of the pump unit may be about the same size as the outer diameter $D_r$ of the rotor 4, or at most, equal thereto. These relationships provide the functional advantages set forth above in connection with the previously described embodiment. Further, as illustrated, the seal 5a is located closely adjacent the bearing assembly and disposed radially inwardly thereof. To this end, the housing 1a is provided with an annular recess defining two walls of a pocket for the seal at the juncture of the radial portion 24 of the housing 1a and the annular part 16. The other walls of the pocket, as illustrated, are defined by the rear face of the impeller and the hub portion 21.

Figure 3:
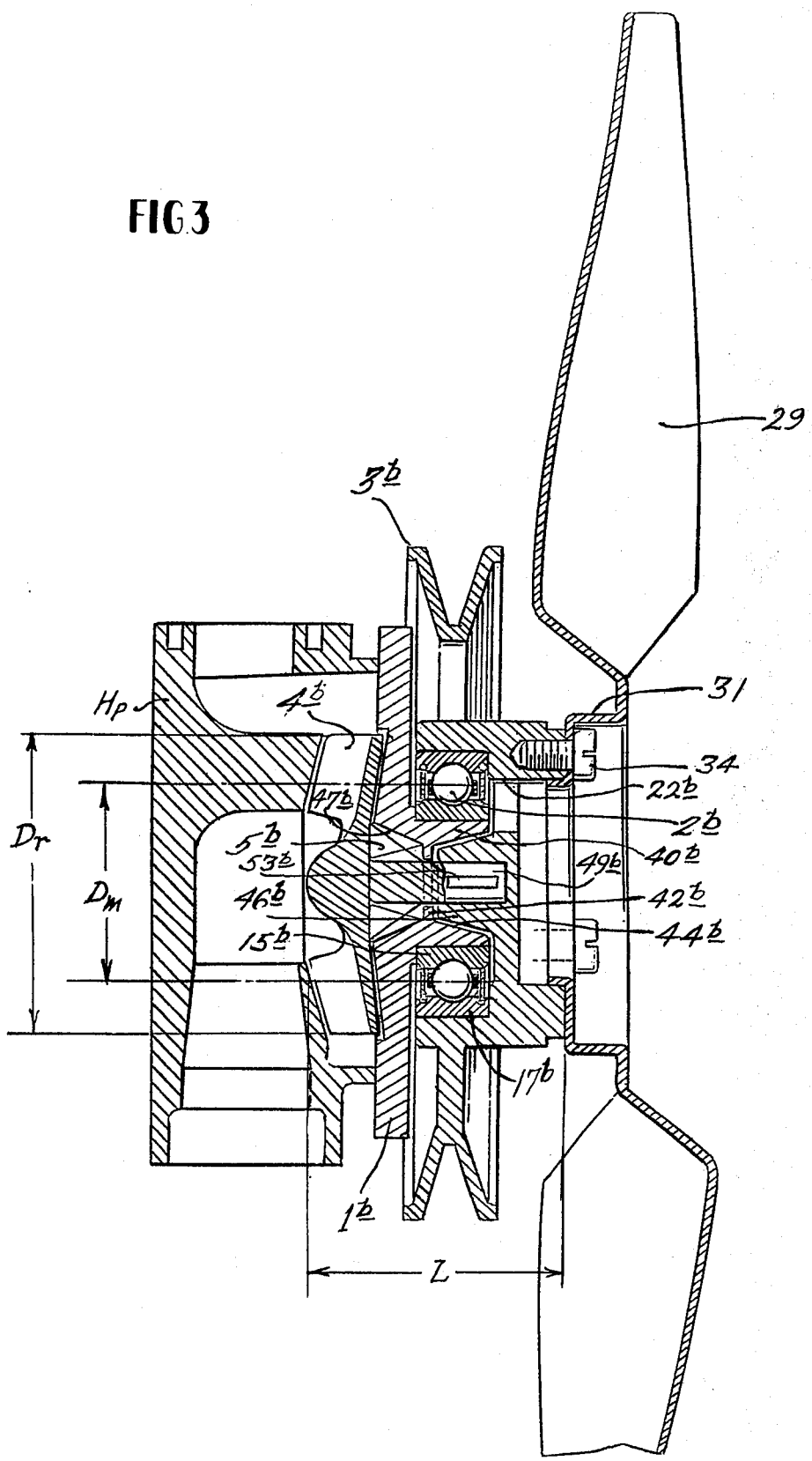
FIG. 3 is a sectional view of still another embodiment of pump unit in accordance with the present invention.

FIG. 3 shows another embodiment of pump unit in accordance with the present invention. The elements of the pump unit similar to those of the previously described embodiment, are designated by the same numeral with the letter $b$ postscript. Thus the pump unit comprises a pump unit housing 1b adapted to be secured by suitable means to the main pump housing $H_p$, for example, in the manner described previously, a rotor or impeller 4b, one end of which is disposed interiorly of the pump housing $H_p$ and is secured to a drive member 3b, which in the present instance has a sheave or pulley formed integrally therewith for a belt connected to a suitable drive means to rotate the impeller. The drive member 3b mounts at its outer end remote from the pump unit housing 1b, a fan wheel 29 connected at its hub portion 31 in a suitable manner, for example, by screws 34. The bearing 2b in the present instance, is illustrated as a single row deep groove ball bearing comprising an outer ring 17b fitted in the drive member 3b, an inner ring 15b fitted in the pump unit housing 1b and a plurality of balls in the annular space between the rings. However, when a fan wheel 29 is provided, a double row angular contact ball bearing is preferred. The drive member is also provided, in the present instance, with draining/ventilating openings 22b.

In accordance with this embodiment, the axial length L of the pump unit measured from the rotor 4b to the outer end of the drive member 3b and the pitch diameter $D_m$ of the bearing are preferably of the same order of magnitude. Additionally, the axial length L of the pump unit and the outer diameter $D_r$ of the rotor 4 are preferably of the same order of magnitude. Further, the axial length L of the pump unit may be about the same size as the outer diameter $D_r$ of the rotor 4 or, at most, equal thereto. These relationships provide the functional advantages set forth above in connection with the previously described embodiments. Further as illustrated, the seal 5b is located closely adjacent the bearing assembly and disposed radially inwardly thereof. To this end, the pump unit housing 1b is provided with a circumferentially extending flange portion 40b, the outer surface of which defines the seat for the inner ring 15b and which defines interiorly thereof, a pair of pockets separated by a thin web 42b. The outer pocket 44b is outwardly flared to receive the central hub portion 46b of the drive member 3b which is provided with an opening within which the stub shaft 49b of the impeller is mounted by a locking key 53b. The inner pocket 47b is outwardly flared in an opposite direction and mounts therein the seal 5b.

Figure 4:
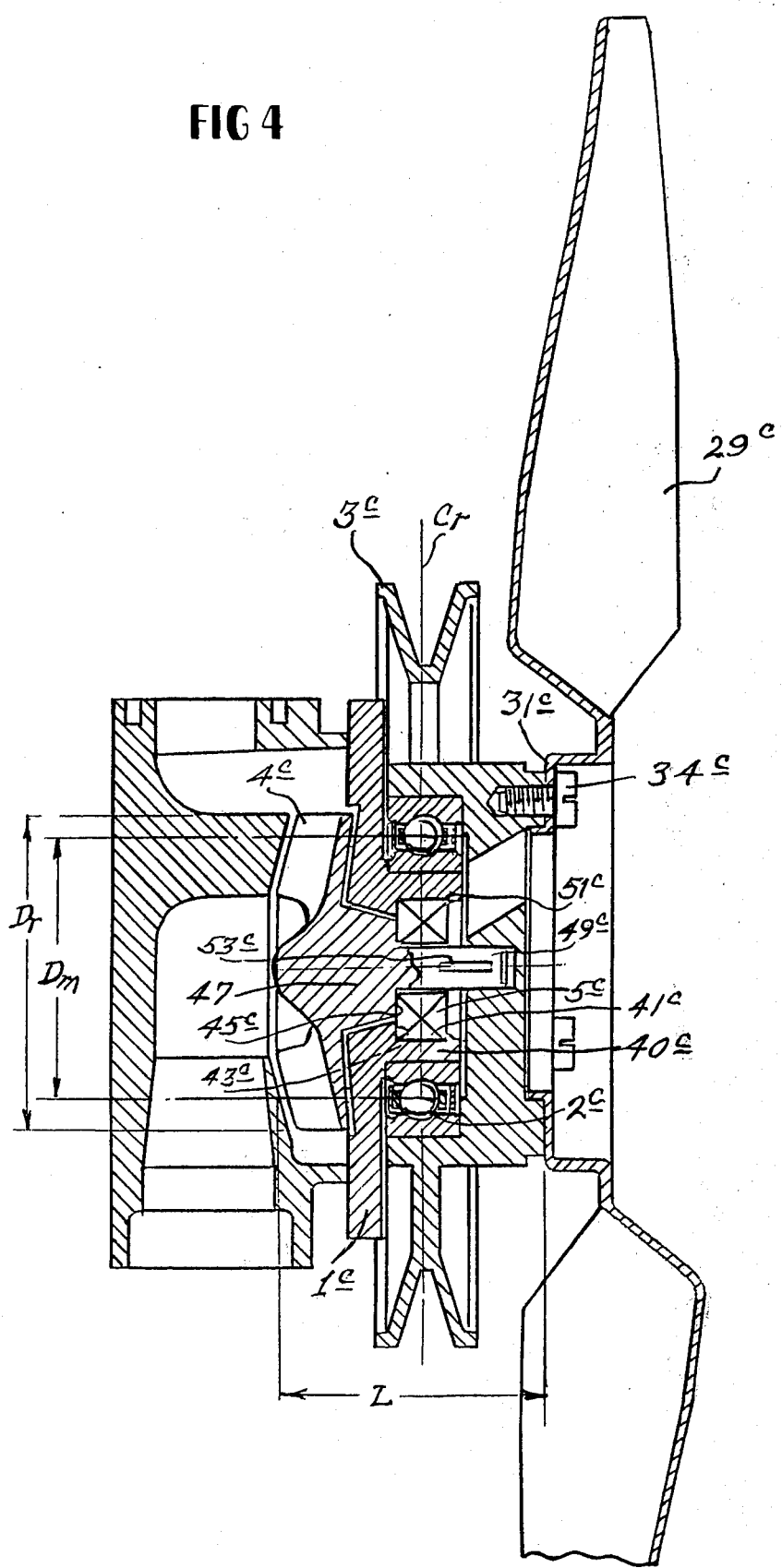
FIG. 4 is a sectional view of a modified form of the pump unit shown in FIG. 3.

There is illustrated in FIG. 4 a modified form of a pump unit constructed in accordance with the present invention. The pump unit is similar to the embodiment of FIG. 3 and accordingly, the basic elements thereof are designated with the same numeral and a letter $c$ postscript. Thus, the pump unit includes a pump unit housing 1c, a bearing 2c, a drive member 3c, a rotor 4c, and a sealing element 5c. In accordance with this embodiment of the invention, the seal 5c which circumscribes the shaft 49c of the impeller, is located closely adjacent the bearing 2c, and is disposed in the radial center line $C_r$ of the bearing. By this arrangement the seal is insensitive to any possible wobbling or warping and provides an optimum extended seal life potential. To accomodate the seal 5c in this location, there is provided an annular pocket defined in part by the inner circumferentially extending wall 41c of the flange portion 40c, a radial shoulder 43c of the flange portion 40c, and a circumferential shoulder 45c aligned with the shoulder 43c at the juncture of the hub 47c of the impeller 4c and the stub shaft 49c. A snap ring 5c seats the seal 5c in the pocket. As illustrated, the shaft 49c is suitably mounted in the opening in the drive member by a locking key 53c.

In the present instance, the axial length L of the pump unit assembly measured from the rotor 4c to the outer end of the drive member 3c and the pitch diameter $D_m$ of the bearing are preferably of about the same order of magnitude. Additionally, the axial length L of the pump unit and the outer diameter $D_r$ of the rotor 4 are preferably of the same order of magnitude. Further, the axial length L of the pump unit may be about the same size as the diameter $D_r$ of the rotor 4 or, at most, equal thereto. These relationships provide the functional advantages set forth above in connection with the previously described embodiments.

The term "order of magnitude" as used herein is defined by the following mathematical definition. Two quantities A and B are of the same "order of magnitude" if $A \sqrt{3} \geq B \geq A/\sqrt{3}$. For example, if $B$ is 1 in., and $A$ is between 1.732 in. and 0.577 in., then $A$ and $B$ are of the same order of magnitude. Thus the axial length L of the pump unit and the pitch diameter $D_m$ of the bearing are of about the same order of magnitude if $D_m \sqrt{3} \geq L \geq D_m/\sqrt{3}$.

The axial length L of the pump unit and the outer diameter $D_r$ of the rotor are of about the same order of magnitude if $D_r \sqrt{3} \geq L \geq D_r/\sqrt{3}$.

I claim:

1. A pump unit for liquid-cooled internal combustion engines preferably for vehicle engines and of the type including a pump unit housing, an impeller, a drive member operatively connected to the impeller to rotate the same forming a rotatable assembly, bearing means supporting the drive member for rotation relative to the housing and a seal adapted to seal an annular space between the rotatable assembly and housing characterized in that the pitch diameter $D_m$ of the bearing and the axial length L of the pump unit as measured from the impeller to the oppositely located end of the drive member are of a relationship wherein $D_m$ is between $1\sqrt{3}$ and $\sqrt{3} L$.

2. A pump unit as claimed in claim 1, wherein the raceway for the bearing is formed as part of said drive member and wherein said drive member is connected directly to said impeller.

3. A pump unit as claimed in claim 1, wherein said seal is an annular member of a smaller diameter than the pitch diameter of the bearing.

4. A pump unit as claimed in claim 1 wherein said bearing comprises a single row deep groove ball bearing.

5. A pump unit as claimed in claim 1 including a plurality of draining and ventilating apertures closely adjacent said bearing for draining coolant which may have passed said seal to a space between said seal and bearing.

6. A pump unit as claimed in claim 3 wherein said seal is located substantially in line with the radial center line of said bearing.

7. A pump unit as claimed in claim 1 Wherein the outer diameter $D_r$ of the impeller and the axial length L of the pump unit as measured from the impeller to the oppositely located end of the drive member are of a relationship wherein $D_r$ is between $1\sqrt{3}$ and $\sqrt{3} L$.

8. A pump unit for liquid-cooled internal combustion engines preferably for vehicle engines and of the type including a pump unit housing, an impeller, a drive member operatively connected to the impeller to rotate the same forming a rotatable assembly, bearing means supporting the drive member for rotation relative to the housing and a seal adapted to seal an annular space between the rotatable assembly and housing characterized in that the outer diameter $D_r$ of the impeller and the axial length L of the pump unit as measured from the impeller to the oppositely located end of the drive member are of a relationship wherein $D_r$ is between $1/\sqrt{3}$ and $\sqrt{3} L$.

9. A pump unit for liquid-cooled internal combustion engines preferably for vehicle engines and of the type including a pump unit housing, an impeller, a drive member operatively connected to the impeller to rotate the same forming a rotatable assembly, a single row deep groove ball bearing supporting the drive member for rotation relative to said housing and an annular seal of a smaller diameter than the pitch diameter of said bearing adapted to seal an annular space between the rotatable assembly and said housing characterized in that the pitch diameter $D_m$ of the bearing and the axial length L of the pump unit as measured from the impeller to the oppositely located end of said drive member are of a relationship wherein $D_m$ is between $1/\sqrt{3}$ and $\sqrt{3} L$.

* * * * *

UNITED STATES PATENT AND TRADEMARK OFFICE
CERTIFICATE OF CORRECTION

PATENT NO. : 3,934,966
DATED : January 27, 1976
INVENTOR(S) : Sture Lennart Asberg It is certified that error appears in the above-identified patent and that said Letters Patent are hereby corrected as shown below:

Claim 1, last line; "$1/\sqrt{3}$ and $\sqrt{3}\,L$" should read -- $L/\sqrt{3}$ and $L\sqrt{3}$ --;

Claim 7, last line, "$1/\sqrt{3}$ and $\sqrt{3L}$" should read -- $L/\sqrt{3}$ and $L\sqrt{3}$ --;

Claim 8, last line, "$1/\sqrt{3}$ and $\sqrt{3}\,L$" should read -- $L/\sqrt{3}$ and $L\sqrt{3}$ --;

Claim 9, two last lines, "$1/\sqrt{3}$ and $\sqrt{3}\,L$" should read -- $L/\sqrt{3}$ and $L\sqrt{3}$ --.

Signed and Sealed this

Twenty-fourth Day of August 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,934,966
DATED : January 27, 1976
INVENTOR(S) : Sture Lennart Asberg It is certified that error appears in the above-identified patent and that said Letters Patent are hereby corrected as shown below:

Claim 1, last line; "$1 \sqrt{3}$ and $\sqrt{3} L$" should read -- $L/\sqrt{3}$ and $L\sqrt{3}$ --;

Claim 7, last line, "$1 \sqrt{3}$ and $\sqrt{3}L$" should read -- $L/\sqrt{3}$ and $L\sqrt{3}$ --;

Claim 8, last line, "$1/\sqrt{3}$ and $\sqrt{3} L$" should read -- $L/\sqrt{3}$ and $L\sqrt{3}$ -- ;

Claim 9, two last lines, "$1/\sqrt{3}$ and $\sqrt{3} L$" should read -- $L/\sqrt{3}$ and $L\sqrt{3}$ --.

This certificate supersedes certificate of correction issued August 24, 1976.

Signed and Sealed this

Seventh Day of November 1978

[SEAL]

Attest:

RUTH C. MASON
Attesting Officer

DONALD W. BANNER
Commissioner of Patents and Trademarks